3,164,638
METHOD FOR PREPARATION OF REACTION PRODUCTS OF DIBORANE AND CONJUGATED DIOLEFINS
Eugene J. De Lorenzo, Bronx, N.Y., and Robert V. Wright, North Highland, Calif., assignors to Olin Mathieson Chemical Corporation, a corporation of Virginia
No Drawing. Filed Apr. 20, 1961, Ser. No. 104,471
5 Claims. (Cl. 260—606.5)

This invention relates to the preparation of liquid reaction products of diborane and a conjugated diolefin.

The liquid products of this application can be employed as fuels according to the method described in application Serial No. 497,407, filed March 28, 1955, now U.S. Patent No. 2,999,117, by Elmas R. Altwicker, Alfred B. Garrett, Samuel W. Harris and Earl A. Weilmuenster.

In accordance with this invention, diborane is reacted with a conjugated diolefin hydrocarbon having from four to five carbon atoms in the presence of a catalytic amount of a lower dialkyl ether.

Suitable conjugated diolefins include 1,3-butadiene, 2-methyl-1,3-butadiene (isoprene) and the like.

hydrocarbon solvents such as benzene, toluene and xylene and cycloaliphatic solvents such as cyclohexane and methylcyclopentane.

The following examples illustrate the process of the invention.

EXAMPLES I–IX

In the following examples a 150 ml. high-pressure cylinder which contained a thermocouple connected to a temperature recorder was employed. The cylinder was provided with a 930 p.s.i.g. rupture disk assembly, a 0 to 1000 p.s.i.g. pressure gauge and a needle valve. After cooling the reactor to $-196°$ C. to condense the gaseous reactants, the assembly was connected to a rocking mechanism in an electrically heated silicone oil bath. The temperature was raised until the reaction took place and when pyrolysis was desired further heating was continued. After the reaction was completed the cylinder was cooled to room temperature, the gases bled off and sampled, the reactor disassembled in a dry box and the reaction product removed. Separation of the various products was achieved by filtration and distillation. The following Table I lists the conditions of the examples and the results obtained.

*Table I*

| Ex. No. | Butadiene, moles | Diborane, moles | Dimethyl ether, moles | Other Ingredients, moles | Initial Temp., °C.[a] | Maximum Temp., °C.[b] | Time, min. | Pyrolysis[c] Temp., °C. | Pyrolysis[c] Time, hr. | Boron Content of Non-Volatile Product Percent Boron |
|---|---|---|---|---|---|---|---|---|---|---|
| I | .075 | .150 | | {Nitrogen, 13.6 / n-Pentane, .2} | 55 | 130 | 1 | | | 21 |
| II | .075 | .150 | | Nitrogen, 13.6 | 40 | 120 | 1 | | | 17.5 |
| III | .075 | .205 | | n-Pentane, .2 | 50 | 180 | 1 | 65 | 2 | 21.7 |
| IV | .04 | .142 | | n-Pentane, .4 | 40 | 60 | d 20 | 72 | 3 | 30.0 |
| V | .075 | .275 | | n-Pentane, .4 | 35 | 72 | d 15 | 77 | 2¾ | 28.9 |
| VI | .075 | .150 | .2 | n-Pentane, .2 | −10 | 140 | 1 | | | 19.3 |
| VII | .075 | .150 | .025 | n-Pentane, .2 | −10 | 100 | 1 | 85 | 3½ | 41.2 |
| VIII | .075 | .150 | .025 | | −10 | | 1 | 85 | 3½ | 31.3 |
| IX | .075 | .225 | .025 | n-Pentane, .2 | −10 | 85 | 1 | 95–130 | 1½ | 42.2 |

[a] Initial temperature is the temperature at which the initial reaction between diborane and butadiene began.
[b] Maximum temperature is the maximum recorded temperature during the initial reaction.
[c] The pyrolysis conditions refer to the heating of the reactor containing the products of the initial reaction.
[d] It can be observed that diluting the reaction with n-pentane slows the reaction.

The ratio of reactants can be varied widely, generally being in the range of 0.1 to 10 moles of diborane per mole of conjugated diolefin and preferably in the range of 2 to 4 moles of diborane per mole of conjugated diolefin. The ratio of lower dialkyl ether employed can also be varied widely, generally being in the range of 0.1 to 10 moles of lower dialkyl ether per mole of diborane and preferably in the range of 0.2 to 2 moles of lower dialkyl ether per mole of diborane. The reaction is initiated by heating the reaction mixture to a temperature at which a spontaneous exothermic reaction occurs, generally about $-10°$ C. The temperature of the reaction mixture is advantageously slowly raised to the initiation temperature at a rate of about 3 to 5 degrees per minute. Also, the reaction mixture advantageously is heated after the spontaneous exothermic reaction subsides at a temperature within the range of about 60° to 150° C. for from 2 to 4 hours. The reaction generally requires about one minute to about 10 hours depending on the ratio of the particular reactants and the temperature and pressure employed.

Suitable lower dialkyl ethers include dimethyl ether, diethyl ether, di-n-propyl ether, diisopropyl ether, methyl ethyl ether, ethyl-n-propyl ether and the like. While n-pentane is employed in the examples of this application other suitable hydrocarbon solvents include aliphatic hydrocarbon solvents such as hexane and heptane, aromatic In Examples I and II, the effect of impressed pressure (nitrogen) on the reaction in the presence and absence of n-pentane was determined. In the presence of n-pentane as a diluent a higher reaction initiation temperature was required. In Examples III, IV and V, a ratio of diborane to butadiene of about 3 to 1 was employed and as the amount of n-pentane diluent was increased, the reaction initiation temperature decreased and the exothermic reaction period was increased. No rapid surge in temperature as had previously been noted was obtained. In Examples VI, VII, VIII and IX, varying amounts of dimethyl ether were introduced into the reaction system. In each of these four examples the reaction initiation temperature was approximately $-10°$ C. The reaction initiation temperature in those examples in which dimethyl ether was present was between 45 to 65° C. lower than the reaction initiation temperatures of those examples conducted without the dimethyl ether. The dimethyl ether was effective in lowering the initial reaction temperature either with or without the n-pentane diluent. More important, however, a comparison of Examples VII and IX with Examples III, IV and V shows that the presence of a catalytic amount of dimethyl ether provides a product having a boron content greater than 40 percent as opposed to a maximum of 30 percent boron obtainable without the dimethyl ether. The product obtained in Examples VI, VII, VIII and IX was not pyrophoric and in Example VII infrared analysis indicated an alkylated decaborane-type structure with little or no diborane product present.

The liquid compositions of this invention can be employed as fuels when burned with air. Thus, they can be used as fuels in basic and auxiliary combustion systems in gas turbines, particularly aircraft gas turbines of the turbojet or tubroprop type. Each of those types is a device in which air is compressed and fuel is then burned in a combustor in admixture with the air. Following this, the products of combustion are expanded through a gas turbine. The liquid products of this invention are particularly suited for use as a fuel in the combustors of aircraft gas turbines of the types described in view of their improved energy content, combustion efficiency, combustion stability, flame propagation, operational limits and heat release rates over fuels normally used for these applications.

The combustor pressure in a conventional aircraft gas turbine varies from a maximum at static sea level conditions to a minimum at the absolute ceiling of the aircraft, which may be 65,000 feet or 70,000 feet or higher. The compression ratios of the current and near future aircraft gas turbines are generally within the range from 5:1 to 15: or 20:1, the compression ratio being the absolute pressure of the air after having been compressed (by the compressor in the case of the turbojet or turboprop engine) divided by the absolute pressure of the air before compression. Therefore, the operating combustion pressure in the combustor can vary from approximately 90 to 300 pounds per square inch absolute at static sea level conditions to about 5 to 15 pounds per square inch absolute at the extremely high altitudes of approximately 70,000 feet. The liquid products of this invention are well adapted for efficient and stable burning in combustors operating under these widely varying conditions.

In normal aircraft gas turbine practice it is customary to burn the fuel, under normal operating conditions, at overall fuel-air ratios by weight of approximately 0.012 to 0.020 across a combustion system when the fuel employed as a simple hydrocarbon, rather than a borohydrocarbon of the present invention. Excess air is introduced into the combustor for dilution purposes so that the resultant gas temperature at the turbine wheel in the case of the turbojet or turboprop engine is maintained at the tolerable limit. In the zone of the combustor where the fuel is injected the local fuel-air ratio is approximately stoichiometric. This stoichiometric fuel to air ratio exists only momentarily, since additional air is introduced along the combustor and results in the overall ratio of approximately 0.012 to 0.020 for hydrocarbons before entrance into the turbine section. In the case of the higher energy fuels of the present invention, because of their higher heating values in comparison with the simple hydrocarbons, the overall fuel-air ratio by weight across the combustor will be approximately 0.008 to 0.016 if the resultant gas temperature is to remain within the presently established tolerable temperature limits. Thus, when used as the fuel supplied to the combustor of an aircraft gas turbine engine, the liquid products of the present invention are employed in essentially the same manner as the simple hydrocarbon fuels presently being used. The fuel is injected into the combustor in such a manner that there is established a local zone where the relative amounts of fuel and air are approximately stoichiometric so that combustion of the fuel can be reliably initiated by means of an electrical spark or some similar means. After this has been done, additional air is introduced into the combustor in order to cool suffciently the products of combustion before they enter the turbine so that they do not damage the turbine. Present day turbine blade materials limit the turbine inlet temperature to approximately 1600° to 1650° F. Operation at these peak temperatures is limited to periods of approximately five minutes at takeoff and climb and approximately 15 minutes at combat conditions in the case of military aircraft. By not permitting operation at higher temperatures, and by limiting the time of operation at peak temperatures, satisfactory engine life is assured. Under normal cruising conditions for the aircraft, the combustion products are sufficiently diluted with air so that a temperature of approximately 1400° F. is maintained at the turbine inlet.

The liquid products of this invention can also be employed as aircraft gas turbine fuels in admixture with the hydrocarbons presently being used, such as JP–4. When such mixtures are used, the fuel-air ratio in the zone of the combustor where combustion is initiated and the overall fuel-air ratio across the combustor will be proportional to the relative amounts of borohydrocarbon of the present invention and hydrocarbon fuel present in the mixture, and consistent with the air dilution required to maintain the gas temperatures of these mixtures within accepted turbine operating temperatures.

Because of their high chemical reactivity and heating values, the liquid products of this invention can be employed as fuels in ramjet engines and an afterburning and other auxiliary burning schemes for the turbojet and bypass or ducted type engines. The operating condition of afterburning or auxiliary burning schemes are usually more critical at high altitudes than those of the main gas turbine combustion system because of the reduced pressure of the combustion gases. In all cases the pressure is only slightly in excess of ambient pressure and efficient and stable combustion under such conditions is normally difficult with simple hydrocarbons. Extinction of the combustion process in the afterburner may also occur under these conditions of extreme altitude operations with conventional aircraft fuels.

The burning characteristics of the liquid products of this invention are such that good combustion performance can be attained even at the marginal operating conditions encountered at high altitudes, insuring efficient and stable combustion and improvement in the zone of operation before lean and rich extinction of the combustion process is encountered. Significant improvements in the non-afterburning performance of a gas turbine-afterburner combination is also possible because the high chemical reactivity of the products of this invention eliminates the need of flameholding devices within the combustion zone of the afterburner. When employed in an afterburner, the fuels of this invention are simply substituted for the hydrocarbon fuels which have been heretofore used and no changes in the manner of operating the afterburner need be made.

The ramjet is also subject to marginal operating conditions which are similar to those encountered by the afterburner. These usually occur at reduced flight speeds and extremely high altitudes. The liquid products of this invention will improve the combustion process of the ramjet in much the same manner as that described for the afterburner because of their improved chemical reactivity over that of simple hydrocarbon fuels. When employed in a ramjet, the liquid fuels of this invention will be simply substituted for hydrocarbon fuels and used in the established manner.

We claim:

1. A method for the preparation of reaction products of diborane and a conjugated diolefin which comprises reacting 2 to 4 moles of diborane per mole of a conjugated diolefin hydrocarbon containing 4 to 5 carbon atoms at a temperature within the range from about −10° C. to about +150° C. while the reactants are in admixture with 0.1 to 10 moles of dimethyl ether per mole of diborane.

2. The method of claim 1 in which the conjugated diolefin is 1,3-butadiene.

3. A method for the preparation of reaction products of diborane and a conjugated diolefin which comprises reacting 2 to 4 moles of diborane per mole of a conjugated diolefin hydrocarbon containing 4 to 5 carbon atoms in the presence of 2 to 4 moles of a hydrocarbon solvent per mole of conjugated diolefin at a temperature within the range from about −10° C. to about +150° C. while the reactants are in admixture with 0.2 to 2 moles of dimethyl ether per mole of diborane.

4. A method for the preparation of non-pyrophoric reaction products of diborane and a conjugated diolefin hydrocarbon which compries (1) reacting from about 2 to 10 moles of diborane per mole of a conjugated diolefin hydrocarbon containing 4 to 5 inclusive carbon atoms under autogenous pressure at a temperature of from about −10° C. to about 150° C. while the reactants are in admixture with from about 0.1 to about 10 moles of dimethyl ether per mole of diborane, (2) heating the reaction mixture thus formed under autogenous pressure at a temperature of from about 60° C. to about 150° C. for about 2 to about 4 hours and (3) recovering the non-pyrophoric reaction product.

5. The method of claim 4 wherein the conjugated olefin hydrocarbon is 1,3-butadiene.

References Cited by the Examiner

UNITED STATES PATENTS 2,964,567    12/60    Neff _____ 260—606.5
3,008,997    11/61    Saegebarth _____ 260—606.5

OTHER REFERENCES

Brown et al.: (1) J. Am. Chem. Soc., vol. 81, pp. 5832–3 (Nov. 5, 1959).

Brown et al.: (2) J. Org. Chem., vol. 22, pp. 1136–7 (1957).

TOBIAS E. LEVOW, *Primary Examiner.*

LEON D. ROSDOL, *Examiner.*